(12) United States Patent
Suriyaarachchi et al.

(10) Patent No.: US 11,472,139 B2
(45) Date of Patent: Oct. 18, 2022

(54) AUTOMATED COMPOSITE FABRICATION SYSTEMS AND METHODS

(71) Applicant: The Boeing Company, Chicago, IL (US)

(72) Inventors: Raviendra Sidath Suriyaarachchi, Kirkland, WA (US); Darrell Darwin Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/875,908

(22) Filed: May 15, 2020

(65) Prior Publication Data

US 2021/0354404 A1 Nov. 18, 2021

(51) Int. Cl.
| | |
|---|---|
| B29C 65/78 | (2006.01) |
| B29C 70/54 | (2006.01) |
| B29C 70/38 | (2006.01) |
| B29C 31/08 | (2006.01) |
| B29C 70/42 | (2006.01) |
| B64C 1/06 | (2006.01) |
| B26D 7/18 | (2006.01) |
| B29C 65/00 | (2006.01) |

(52) U.S. Cl.
CPC ......... B29C 70/545 (2013.01); B29C 31/085 (2013.01); B29C 70/38 (2013.01); B29C 70/386 (2013.01); B29C 70/42 (2013.01); B26D 7/18 (2013.01); B26D 7/1854 (2013.01); B29C 65/7888 (2013.01); B29C 66/863 (2013.01); B29C 2793/0081 (2013.01); B64C 1/061 (2013.01); Y10T 156/1075 (2015.01); Y10T 156/1744 (2015.01)

(58) Field of Classification Search
CPC ............ B29C 2793/0081; B29C 41/35; Y10T 156/1744; Y10T 156/1075; B26D 7/018; B26D 7/1854; B26D 7/0616; B26D 7/0625
USPC .................................................. 156/558, 566
See application file for complete search history.

(56) References Cited

U.S. PATENT DOCUMENTS 7,841,264 B2 * 11/2010 Kim ...................... B26D 7/018
83/13
9,969,131 B2 5/2018 Samak Sangari et al.
(Continued)

FOREIGN PATENT DOCUMENTS

DE 202014100339 U1 5/2015

OTHER PUBLICATIONS

FANUC America Corporation, "Robotic Assembly System for Electrical Wire Harnesses—Clear Automation", Feb. 19, 2016 https://www.youtube.com/watch?v=IAgrrgTgWbQ.
(Continued)

*Primary Examiner* — Scott W Dodds
(74) *Attorney, Agent, or Firm* — Haynes and Boone, LLP

(57) ABSTRACT

A system and a method for manufacturing laminated composite components is described. The system may include a cutting station configured to separate component layers from a ply of composition material according to a predefined pattern, a build station configured to stack the component layers according to a predetermined orientation, and a finishing station configured to compact the stacked component layers and provide the laminated composite component to an installation station.

20 Claims, 12 Drawing Sheets

(56) References Cited

U.S. PATENT DOCUMENTS

| | | | | |
|---|---|---|---|---|
| 2007/0160822 A1* | 7/2007 | Bristow | ................. | B29C 43/02 |
| | | | | 428/304.4 |
| 2013/0306228 A1* | 11/2013 | Buehlmeyer | ....... | B32B 38/0012 |
| | | | | 156/222 |
| 2015/0314583 A1 | 11/2015 | Jess et al. | | |
| 2019/0224928 A1 | 7/2019 | Danninger et al. | | |
| 2019/0240932 A1* | 8/2019 | Graf | ..................... | B29C 70/386 |

OTHER PUBLICATIONS

Wall Street Journal "The Robot Revolution: The New Age of Manufacturing—Moving Upstream", Feb. 1, 2018 https://www.youtube.com/watch?v=HX6M4QunVmA.

Broetje-Automation GmbH, "Automated Vacuum Handling System for Textile Composite Materials", Jan. 20, 2011 https://www.youtube.com/watch?v=o1RyeQlt6ys.

Cevotec GmbH, "Samba & Artist Studio Fiber Patch Placement by Cevotec", Sep. 27, 2017 https://www.youtube.com/watch?v=079zA2ifloo.

Mk North America, "Vacuum Conveyor", Jul. 10, 2012 https://www.youtube.com/watch?v=4IV9UG9fArE.

* cited by examiner

AUTOMATED COMPOSITE FABRICATION SYSTEMS AND METHODS

TECHNICAL FIELD

The present application generally relates to fabrication of composite components. More in particular, it relates to automated composite fabrication systems and methods.

BACKGROUND

In certain manufacturing environments, such as a vehicle manufacturing environment, vehicles are assembled at one location and the parts or components used to assemble such vehicles may be fabricated elsewhere, for example at another facility. These parts and components may be fabricated through a laborious process by technicians and the completed parts are placed in storage areas so that the parts may be retrieved when needed for assembling the vehicles. Maintaining proper supply chain in such manufacturing environment is important to ensure parts do not run out when they are needed for assembling the vehicles, thus reducing productivity. To ensure productivity is not negatively affected, sufficiently sized storage area is needed to keep a stock of all of the parts so that they are always available when needed. However, if the production of the vehicles is stopped, unexpectedly terminated, or slowed down, and if the parts are perishable and they remain out of the freezer for too long, or if the working shelf-life of the parts are exceeded, the stock of unused parts in storage may suddenly become unusable excess parts that may eventually have to be discarded, thus wasting money and resources. Therefore, techniques for fabricating parts more efficiently and reducing the waste is desired.

SUMMARY

According to an example, a system for manufacturing laminated composite components is described. The system may include: a cutting station configured to separate component layers from a ply of composition material according to a predefined pattern; a build station configured to stack the component layers according to a predetermined orientation; and a finishing station configured to compact the stacked component layers and provide the laminated composite component to an installation station.

According to another example, a method for manufacturing laminated composite components is described. The method may include: separating, at a cutting station, component layers from a ply of composition material according to a predefined pattern; stacking, at a build station, the component layers according to a predetermined orientation; and compacting, at a finishing station, the stacked component layers and providing the laminated composite component to an installation station.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
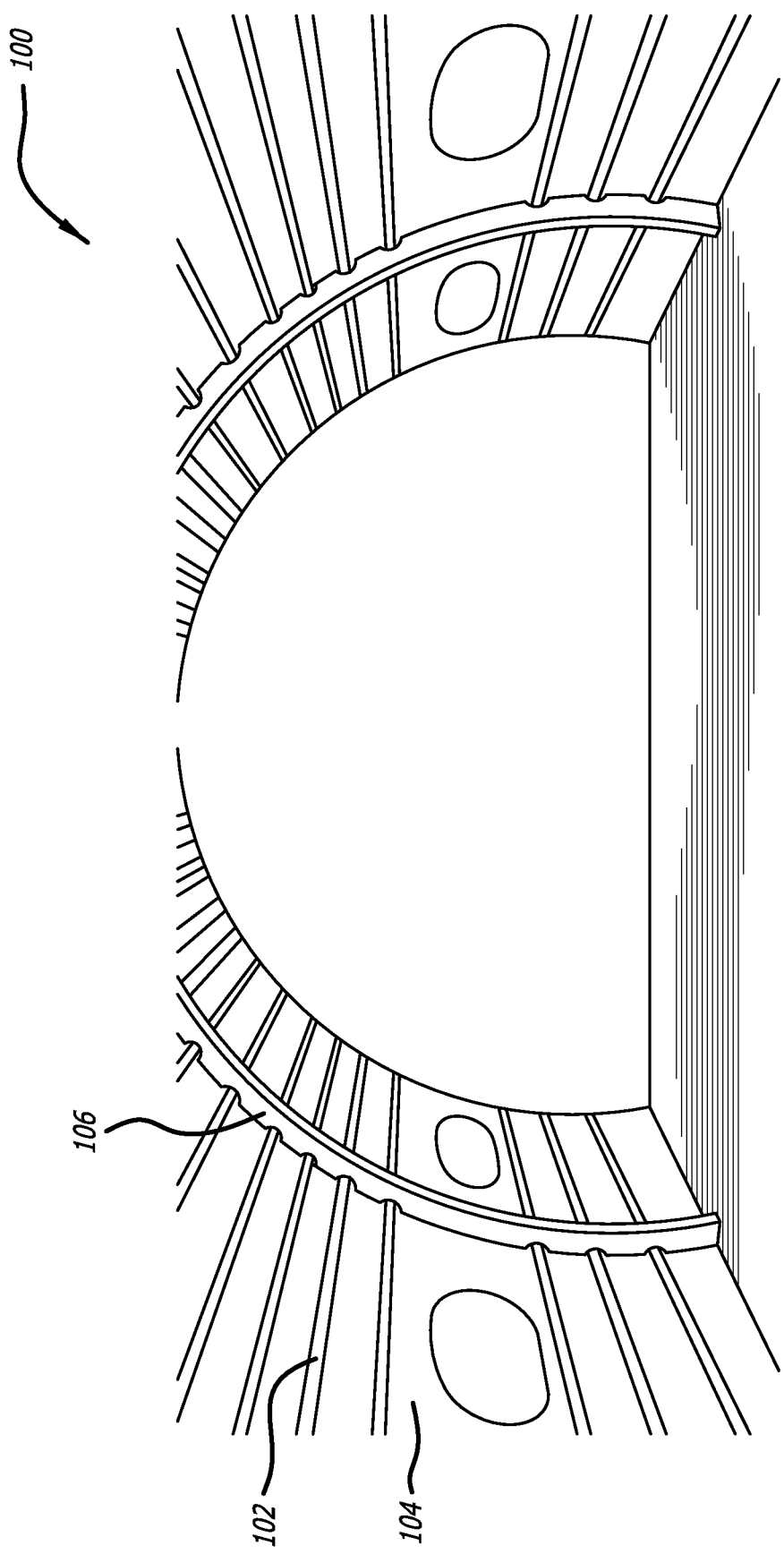
FIGS. 1, 2A, and 2B illustrate an interior view of an example aircraft fuselage exposing frames, stringers, and frame fillers.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, various examples will be described in more detail with reference to the accompanying drawings. The present invention, however, may be embodied in various different forms, and should not be construed as being limited to only the illustrated examples herein. Rather, they are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Figure 2B:
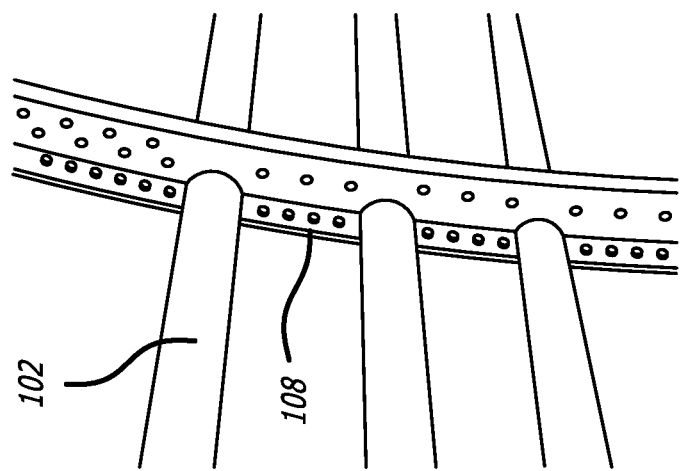
Figure 2A:
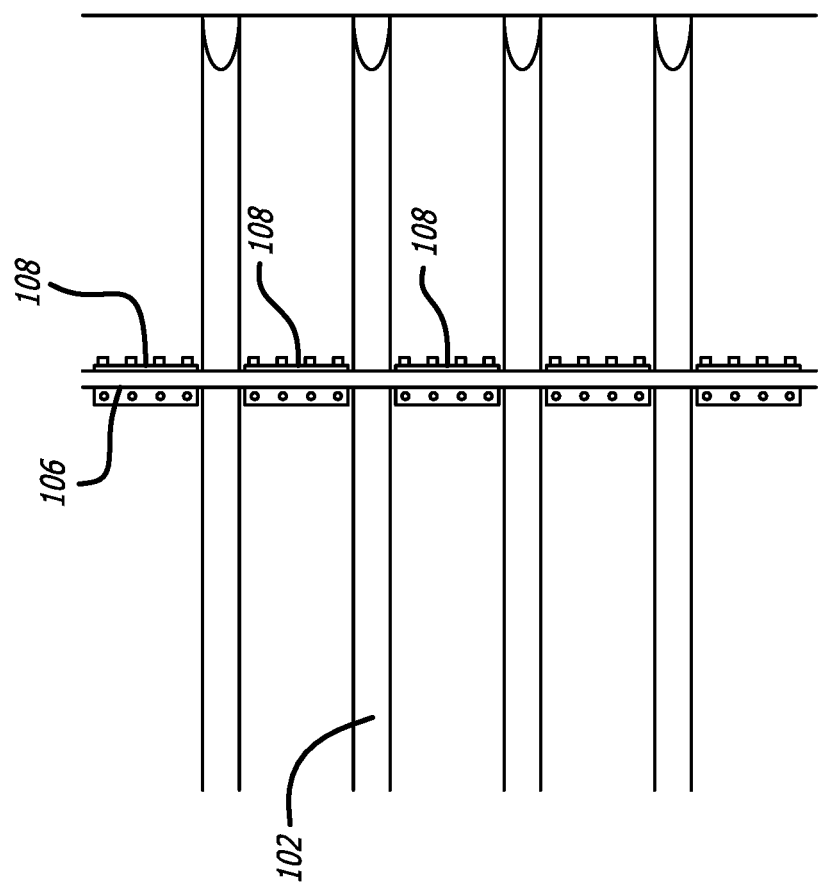

A fuselage of an airplane such as, for example, a commercial passenger airplane, includes various structural features that provide a generally cylindrically tubular and an elongated shape. FIGS. 1, 2A, and 2B illustrate an interior view of an example airplane fuselage 100 exposing some of the structural features. The structural features include radial frames 106 that form the cylindrically tubular shape of the fuselage 100, stringers 102 that run in a longitudinal direction (e.g., forward and aft) relative to the fuselage 100 and are perpendicular to the frame 106. Generally, the plurality of stringers 102 and frames 106 form the structure of the fuselage 100 and is covered by a skin 104 to complete the fuselage 100.

The stringers 102 are stiffening members of the body of the fuselage and may have different thicknesses depending on the location of the fuselage 100. For example, stringers 102 that are located closer toward the bottom of the fuselage may be thicker relative to the stringers 102 that are located toward the top of the fuselage. Thus, if the skin 104 is disposed directly over the stringers 102, there may be a gap between the skin 104 and the thinner stringers 102. To compensate for this gap, a frame filler 108 made of a plurality of plies of composite material laminated together is used to bridge the height between the thickest stringers 102 and the skin 104.

Figure 3:
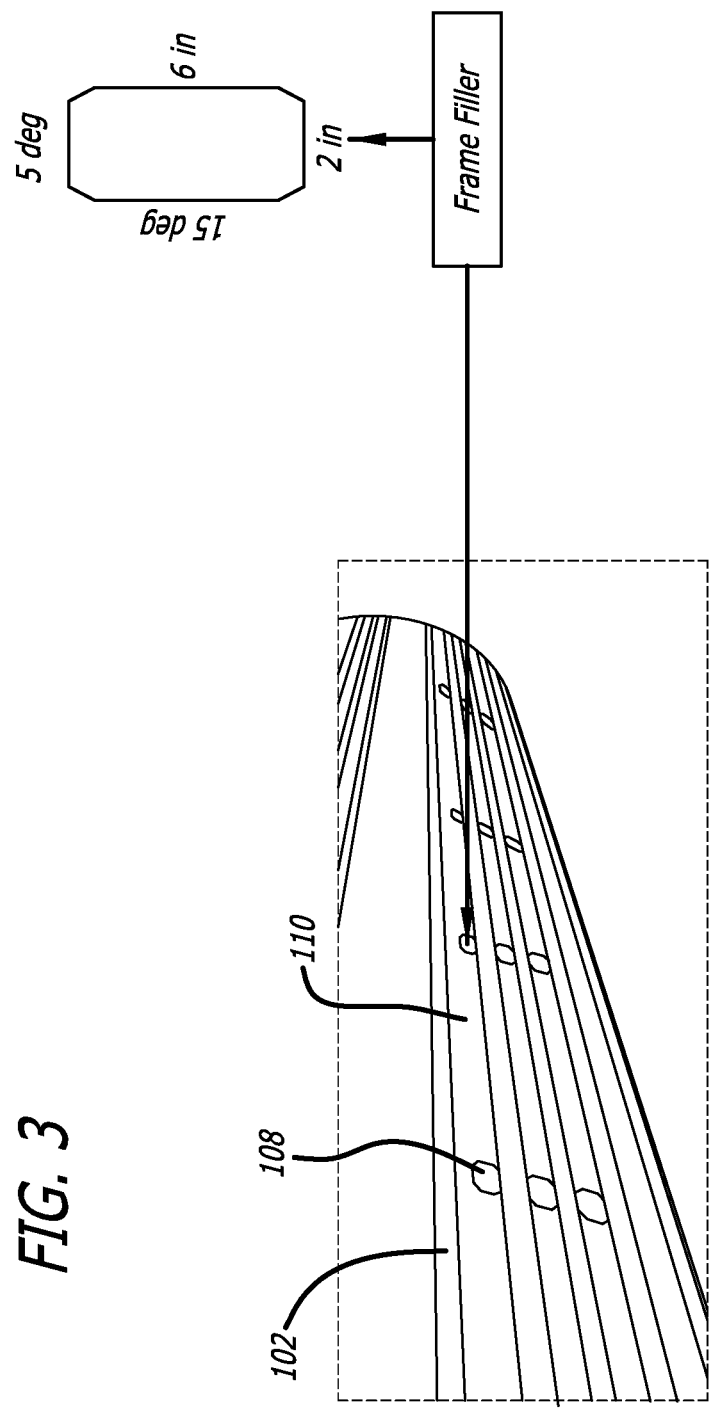
FIG. 3 illustrates an exterior view of an example aircraft fuselage that is being assembled on a curing tool.

FIG. 3 illustrates an exterior view of an example fuselage that is being assembled on a curing tool 110 (e.g., a mandrel). Thus, in this illustration, the stringers 102 and the frame fillers 108 are installed on the curing tool 110 such that the frame fillers 108 are disposed between two stringers 102. Once the stringers 102 and the frame fillers 108 are installed, the skin may then be co-cured over them and bolted to the frames. Thus, airplanes, especially the larger airplanes have many stringers 102 and frames 106 and as such, thousands of frame fillers 108 (e.g., approximately 2 inches by 6 inches) are co-cured on to the fuselage 100 to bridge the gap. However, each frame filler 108 is customized to a specific size, shape, and thickness to fit a specific location of the fuselage. Thus, the shape, size, and/or thickness of each individual frame filler 108 may be different. Consequently, conventional techniques for fabricating the frame fillers 108 for such airplanes is labor intensive and requires human beings to precisely fold and stack such prepreg raw material to form the frame fillers 108. Furthermore, because of the manual fabrication process, the frame fillers 108 are fabricated in batches instead of on-demand. In other words, a batch (or a group) of frame fillers 108 of one specification is made by the humans during a given fabrication process and this batch of the finished frame fillers 108 is placed in storage until they are needed. In the next fabrication process, a different frame filler specification may be fabricated, again in batch mode, and then placed in storage. In this manner, many batches of frame filler 108 are fabricated and stored as parts (e.g., WIP) until they are ready to be installed on the airplane. Thus, the installers of the frame fillers 108 must figure out which frame fillers 108 are needed for that day's work on the fuselage and retrieve the appropriate frame fillers 108 from storage. In some environments, the fabrication of such frame fillers 108 may be performed at a different facility from the airplane assembly factory. For example, the frame fillers 108 may be fabricated by a different company or a subcontractor at a different facility or in a different country, thus resulting in the added cost of ordering and shipping such parts.

The various examples that are provided throughout the present disclosure contemplate systems and methods to automate the fabrication of laminated composite materials such as frame fillers through the use of machinery and robotic devices, and then fabricating such laminated composite materials on-demand, as needed for installation, at an appropriate rate, and in an appropriate order. For example, if a frame filler of a first size is needed, followed by a frame filler of a second size, and then again a frame filler of the first size, then this system and method fabricates the frame fillers in that specific order. Additionally, the frame fillers may be fabricated at the mandrel at the same facility as the airplane that is being assembled so that as each frame filler is fabricated, it can be provided to the installer at the assembly site immediately. Accordingly, as the fabrication of the frame filler is finished, the completed frame filler may be retrieved by a technician and installed on the airplane in real-time, thereby eliminating the need for a storage place at the facility to store the parts because excess frame fillers are not produced, but instead, only the frame fillers that are needed at that moment are fabricated. Furthermore, in case the frame filler is damaged, for example, by the installer when installing the frame filler or if the frame filler is dropped and damaged, a replacement frame filler may be fabricated immediately, thus preventing or at least reducing production delays as a consequence of damaged parts.

Figure 4:
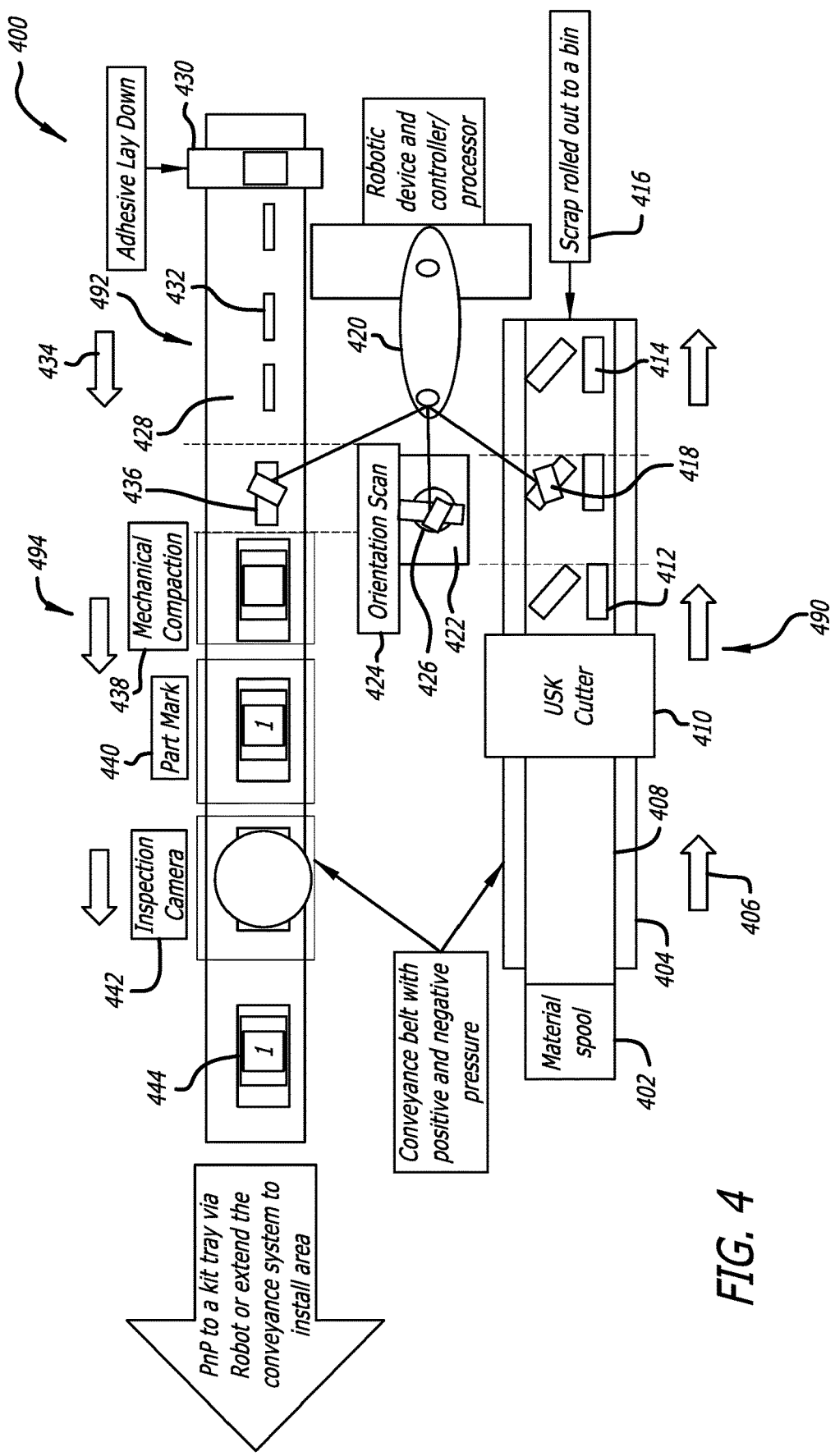
FIG. 4 is an example system layout of a laminated composite component fabrication system, according to various examples of the present disclosure.

FIG. 4 is an example system layout of a laminated composite component fabrication system, according to various examples of the present disclosure. Although the present disclosure will reference the fabrication of the laminated composite component as the fabrication of frame fillers by way of example, it should be understood that the system and methods are applicable to other laminated composite components as well and is not limited to just frame fillers.

According to the illustrated example, the system 400 includes a cutting station 490, a build station 492, and a finishing station 494. Thus, a raw composition material such as a prepreg material may be processed through various machinery and devices that comprise the system 400 and within minutes, a finished frame filler is fabricated and is ready to be installed on an airplane in real-time.

The cutting station 490, includes at least a conveyor 404 and a dispenser 402 configured to hold, for example, a spool of composition material and dispense a single ply of the composition material 408 on to the conveyor 404. The conveyor 404 may also include a vacuum device that is configured to apply a negative pressure to the conveyor 404 and a cutting device 410 that is configured to cut the composition material 408 on to the conveyor 404. According to one example, the cutting device 410 may be an ultrasonic cutter (USK), whereas in other examples, the cutting device 410 may be a laser cutter or other high speed cutters known in the art. As the composition material is dispensed on to the conveyor 404, the conveyor moves the composition material 408 in the direction shown by arrow 406 from a first end of the cutting station 490 toward the second end of the cutting station 490. As the composition material 408 moves to cutting device, the composition material is cut and separated to a component layer 412, which will eventually become one ply of the composition material that becomes laminated together with additional plies of the component layers. The component layers 412 have a predefined shape or pattern based on the specification of the component that is being fabricated and moves toward the second end of the conveyor 404. Once the pattern is cut out, an automated pick and place device picks up the component layer to separate the component layer 418 from the single ply of the composition material 408. The remaining excess composition material 414 continues to move toward the second end of the conveyor and is collected as scrap material in a scrap bin 416.

Figure 5:
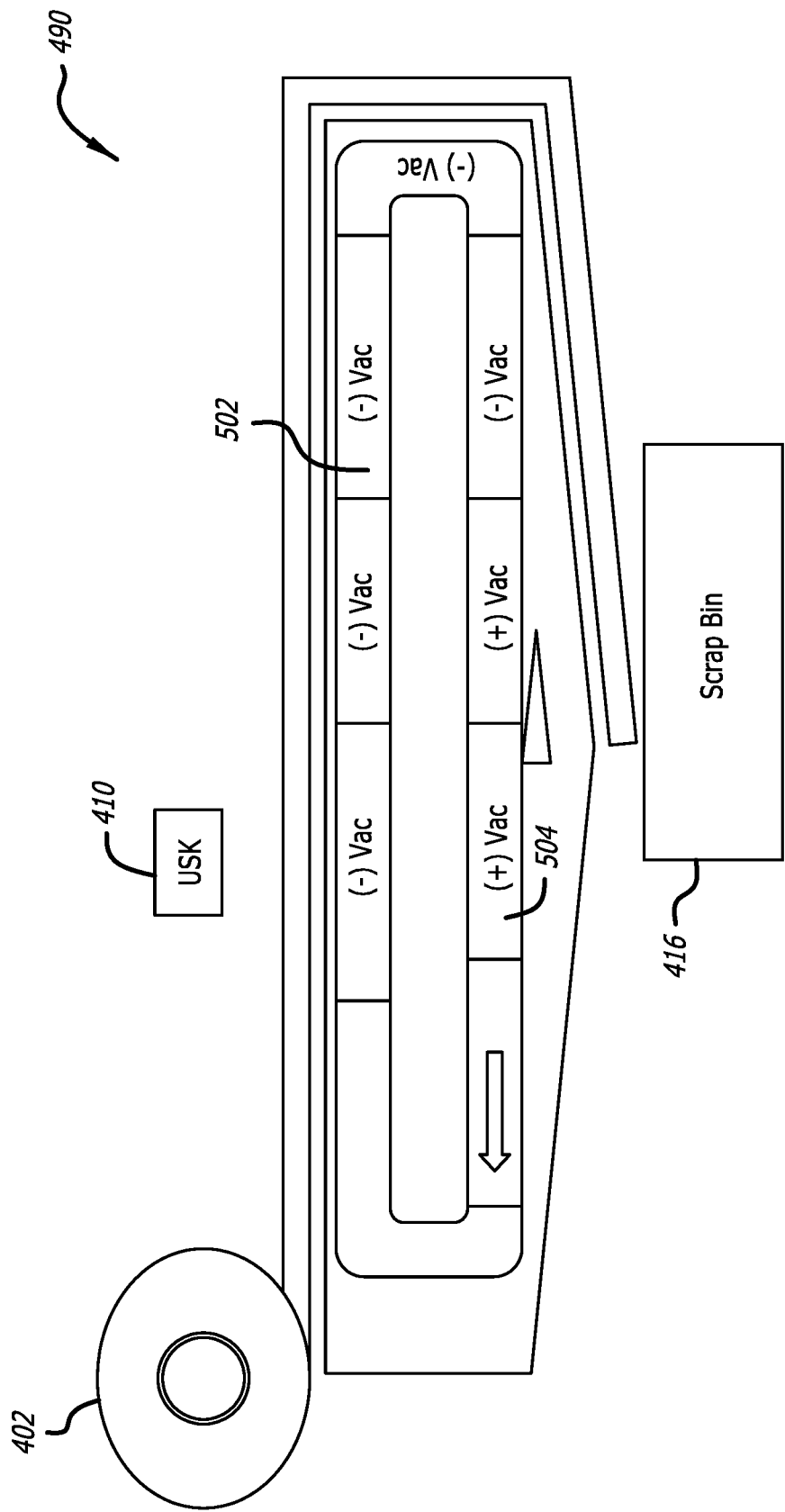
FIG. 5 is a side view of an example cutting station including a conveyor, according to various examples of the present disclosure.

FIG. 5 is a side view of an example cutting station 490 including a conveyor 404, according to various examples of the present disclosure. As illustrated, the raw composition material may be in the form of a spool mounted on a dispenser 402 and is configured to be unrolled on to the conveyor 404. The vacuum device applies a negative pressure 502 to the conveyor to prevent the composition material from falling from the conveyor.

Figure 6:
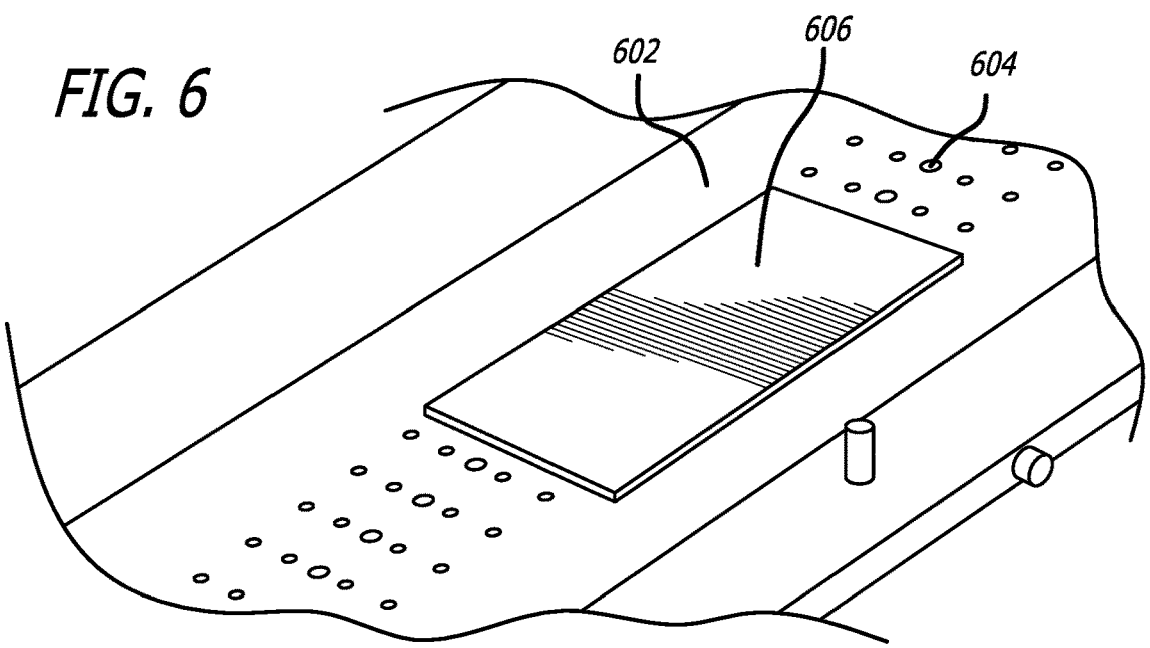
FIG. 6 is a perspective view of an example conveyor that uses a vacuum device to prevent the composition material from falling from the conveyor, according to various examples of the present disclosure.

FIG. 6 illustrates a perspective view of an example conveyor that uses a vacuum device to prevent the composition material 606 from falling from the conveyor, according to various examples of the present disclosure. For example, a conveyor belt 602 of the conveyor 404 may have holes 604 from which the vacuum device applies a suctioning effect from the negative pressure 502 to maintain the composition material 606 on the conveyor belt 602. Thus, when a ply of the composition material 408 is laid out on the conveyor 404, the composition material 408 does not get blown away by circulating air in the environment (e.g., due to movement of personnel or air created by machinery). FIG. 5 illustrates one example configuration of the vacuum device where the negative pressure 502 is created toward the surface of the conveyor in the vicinity of the conveyor belt 602 and a positive pressure 504 is created in the lower portion of the conveyor 404. In this example, the scrap bin 416 is located underneath the conveyor 404 and the vacuum device applies a positive pressure 504 near the scrap bin 416 so that the scrap is removed from the conveyor belt 602 and dropped in the scrap bin 416.

In this manner, a first layer that makes up the laminated composite frame filler is cut out from a single ply of the raw composition material 408. The predefined pattern may be set such that the cut out corresponds to the specific size and shape needed for the first layer of the frame filler. The cutting device 410 is configured to cut out any desired shape or pattern. Thus, each pattern cut out may be different based on the needed size and shape of the next layer.

Turning back to FIG. 4, the build station 492 includes a second conveyor 428 that is configured to receive the component layers 412 from the cutting station 490. For example, a robotic device 420 having a robotic arm and/or a robotic gripper may be configured pick up the component layer 418 from the first conveyor at the cutting station 490 and move it to the build station 492 and place it on the second conveyor 428. According to one example, the robotic device 420 may be further configured to operate with an orientation setting station 422 comprising an orientation determining device 424 that determines the orientation of the component layer when it is picked up by the robotic device 420. The orientation determining device 424 may be an orientation scanner like a camera (e.g., visible range camera, infrared camera, or thermal camera) and uses image processing to determine the orientation. The orientation setting station 422 may further include an orientation setting device 426, which may be for example, a rotatable table that rotates the component layer 418 as it is laid out on the rotatable table and rotates the orientation of the component layer 418 based on the orientation determining device 424 determining the direction in which the component layer needs to be orientated so that it is appropriately placed on the second conveyor. According to another example, the orientation setting device may be embedded as a part of the robotic device 420. Thus, the robotic device 420 may also include an orientation determining device and automatically rotate or orient the component layer while the robotic arm or the gripper holds the component layer. Accordingly, the robotic device 420 may pick up the component layer 418 from the cutting station 490, rotate the orientation of the component layer with, for example, a robotic arm or a rotatable gripper, enroute to the build station 492 and place the component layer on the second conveyor 428.

According to another example of the present disclosure, the build station 492 includes a spool of adhesive layer disposed in an adhesive dispenser 430 at the second conveyor 428. Thus, the adhesive layer 432 may be laid down on the second conveyor 428 so that the component layer 418 may be placed on the adhesive strip so that the component layer 418 does not fall or does not get blown away from the conveyor by air (e.g., circulating air due to personnel movement or air from machinery). In some examples, the adhesive layer 432 may be a poly on one side and paper on the other side. Accordingly, the component layer 418 is moved over from the cutting station 490 and placed on the adhesive layer 432 on the second conveyor 428, and this process may be repeated based on the number of plies used for the particular laminated composite component that is being fabricated. For example, if a 10 ply frame filler is being fabricated, then the above process is repeated 10 times and each time, a new component layer is stacked precisely on top of the previous component layer such that each component layer is concentrically stacked and aligned over each of the other component layers below it. In certain examples, the frame filler includes a beveled or tapered edge, such as a 15 degree bevel or taper. Such beveled or tapered angles may be implemented in the frame filler by changing the size of each component layer cut out so that when the plies are stacked together, the edges form an angle. For example, if the frame filler has a pyramid shape, then the lowermost component layer is the largest and the next layer above it is slightly smaller and so on. Thus, a beveled edge frame filler may be fabricated without having to precisely cut the frame filler at the end to create the beveled angle.

According to one example, the robotic device 420 may include a controller for processing the movement of the robotic device 420. In certain implementations, the controller may be interconnected with the robotic device 420, the cutting station 490, the build station 492, and the finishing station 494 so that the various devices within the various stages of the system 400 can communicate and synchronize the processes with each other. For example, the controller may be configured to process the sequence in which the component layer needs to be cut when assembling a particular type of airplane and to do so, the controller communicates with the interconnected devices of the system 400.

Figure 7:
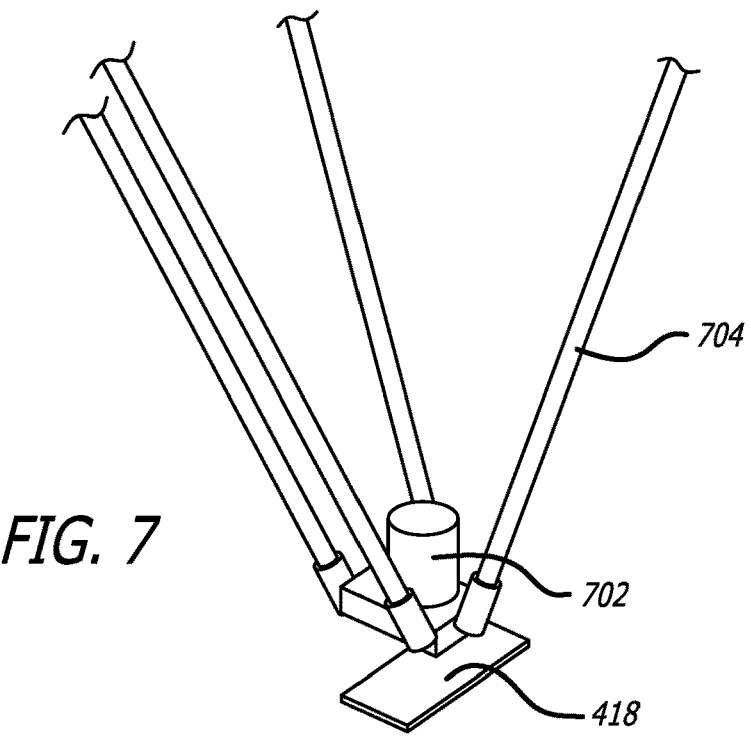
FIGS. 7-9 illustrate example robotic devices that may be implemented to pick and place the composite material from one station to another station, according to various examples of the present disclosure.
Figure 8:
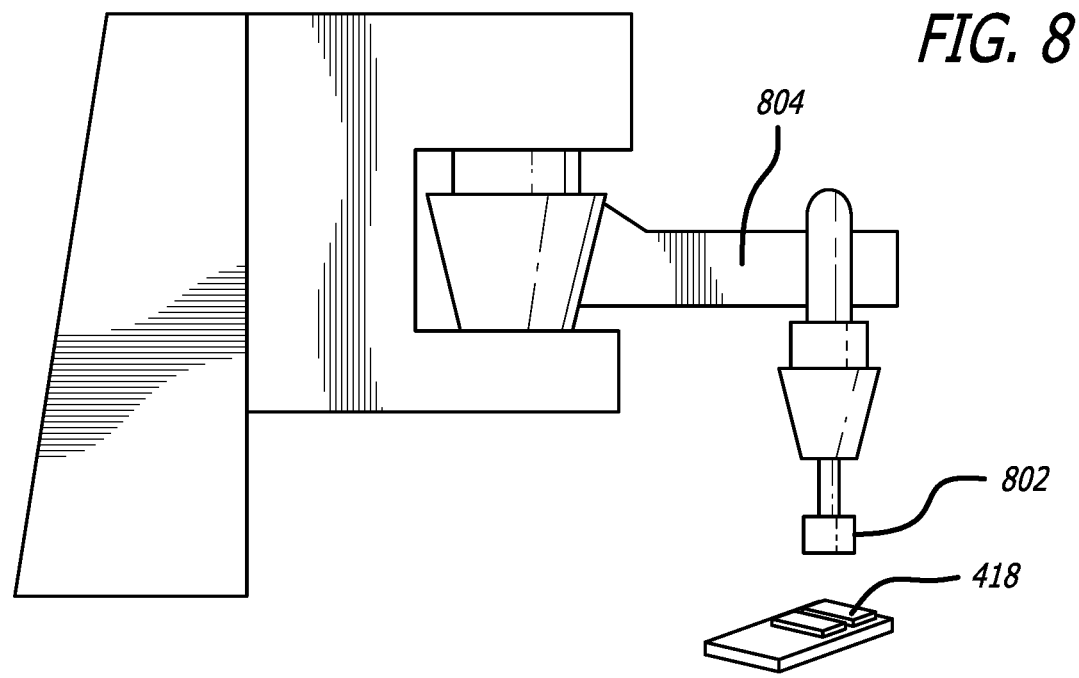
Figure 9:
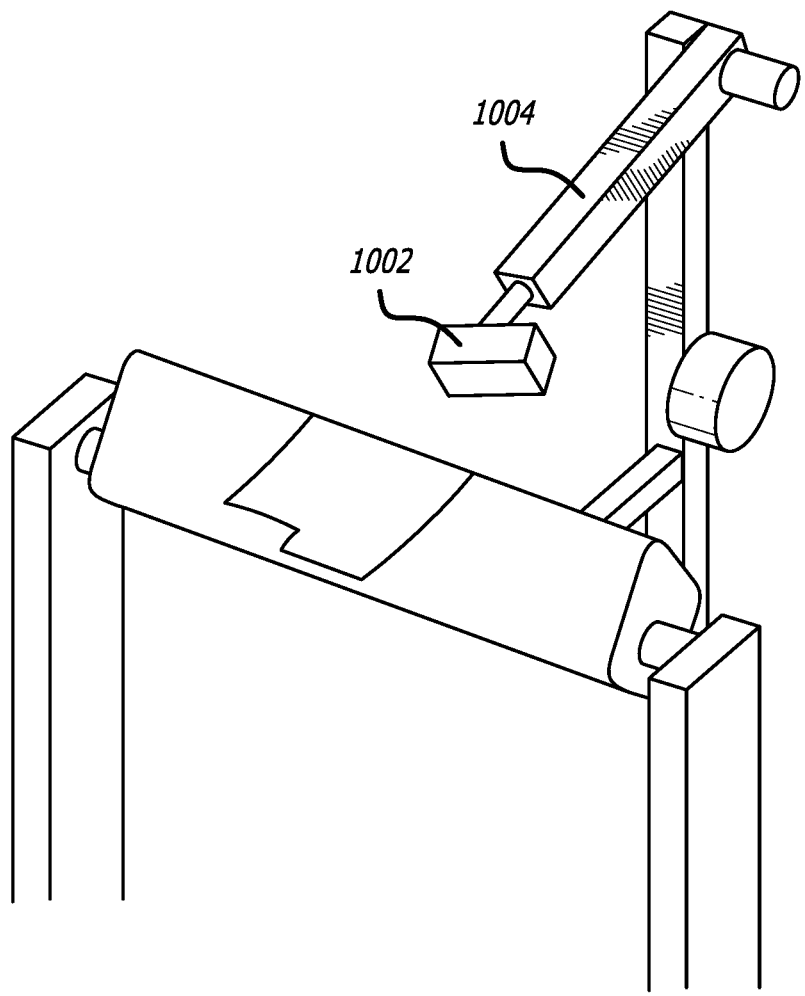

FIGS. 7-9 illustrate example robotic devices that may be implemented to pick and place the composite material from one station to another station, according to various examples of the present disclosure. The example automated robotic device illustrated in FIG. 7 includes a gripper 702 that is supported by a plurality of arms 704 that extend and/or contract. Accordingly, as the arms 704 extend and/or contract, the gripper 702 freely moves from one position to another and pick and place an object such as the component layer 418. FIG. 8 illustrates another type of robotic device that includes a gripper 802 and a robotic arm 804. In this example, the robotic arm 804 can move in various directions to move the gripper 802 from one position to another and pick and place an object such as the component layer 418. FIG. 9 illustrates yet another type of robotic device that includes a gripper 1002 and a robotic arm 1004. In this example, the robotic arm 1004 can move like a human arm in various directions to move the gripper 1002 from one position to another and pick and place an object. Thus, as provided, various types of robotic devices 420 may be implemented to accomplish the process of picking up the component layer 418 from the cutting station 490 and placing it on the build station 492. The robotic devices illustrated in FIGS. 7-9 represent just some examples of pick and place devices that can be implement but is not limited to only those illustrated.

Figure 10:
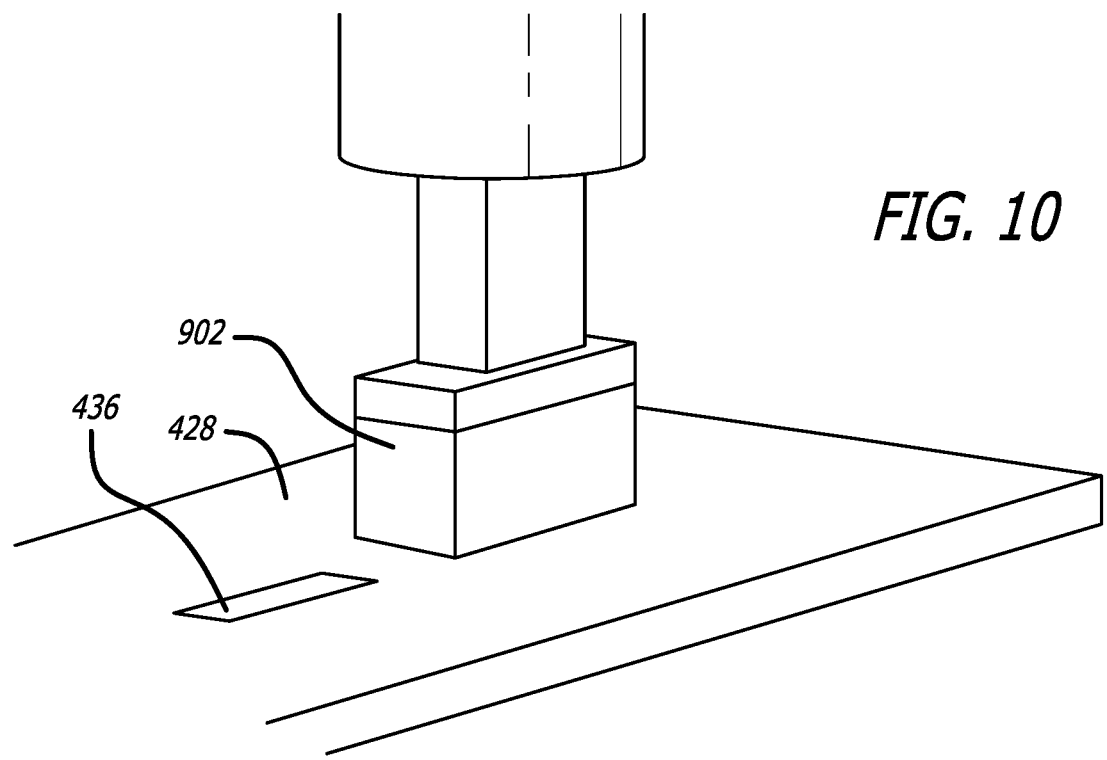
FIG. 10 illustrates an example compactor device that may be implemented to compact a stack of plies of layered composite material, according to various examples of the present disclosure.

Once the desired number of plies are stacked at the build station 492, the stacked component layers are conveyed to the finishing station 494 in the direction of arrow 434, which includes a compactor 438, a part marking device 440, and an inspection device 442. According to one example, the compactor 438 is configured to apply a compressive pressure to the stacked component layers to form a laminated composite component. In certain examples, the compactor 438 may apply a pressure of about 20 to 30 psi, yet in other examples, lower or higher pressures may instead be applied. With prepreg composition materials, the application of the pressure compresses and forces the plies to stick together to form a laminated composite component. In other examples, heat may be applied to the stacked component layers to assist the plies to stick to each other. For example, the second conveyor 428 may have a warming blanket or the compactor may have a heating device. FIG. 10 illustrates an example compactor that may be implemented to compact a stack of layered composite material, according to various examples of the present disclosure. The example compactor may include a compressor head 902 that is configured to apply a force on the stack of the component layers 436 on the second conveyor 428.

Once the component layers are compacted, the second conveyor 428 moves the laminated composite components to the part marking stage where the part marking device 440 imprints a visual indicator on the laminated composite. For example, the imprint may be an arrow or some other visual indicator that tells the installer the correct direction for installing the laminated composite component, or the imprint may be a part number that corresponds to the specific shape and size of the frame filler.

After the component layers are part marked, the laminated composite component is moved to the inspection section where an inspection device 442 performs a quality assurance check to ensure that the laminated composite component meets fabrication standards and tolerances such as, for example, size, shape, squareness, angle of the bevel, etc. In some examples, the inspection device 442 may be a high resolution camera with image processing. If the finished component (e.g., the frame filler) passes inspection, then the frame filler is immediately ready to be installed on an airplane. According to some examples, the frame fillers may be placed on another conveyor or a delivery means to provide the frame filler to the installer for use in real-time.

Figure 11:
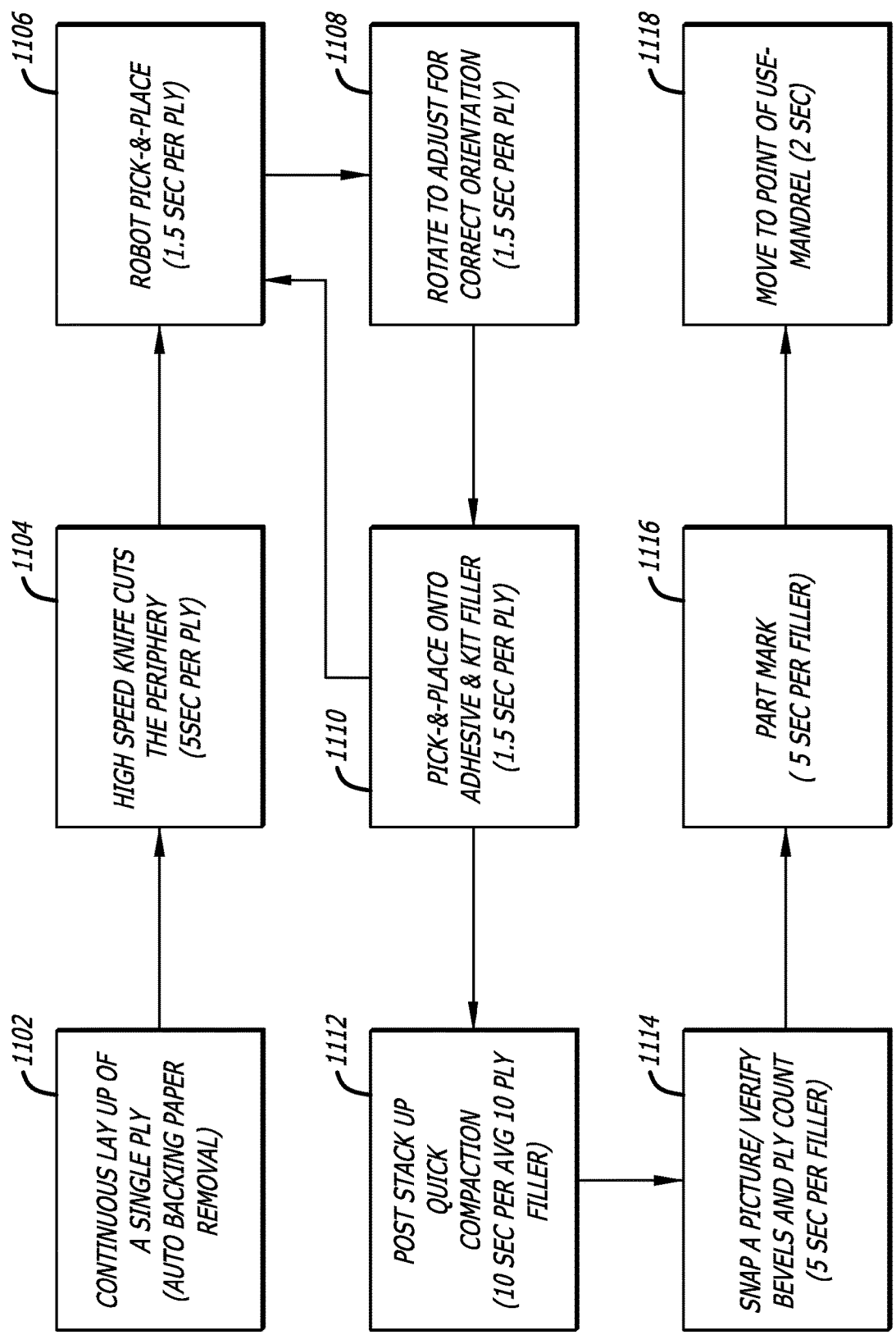
FIG. 11 is a fabrication timing diagram of the laminated composite component fabrication system, according to various examples of the present disclosure.

FIG. 11 is a timing diagram of the composite filler fabrication system, according to various examples of the present disclosure. Step 1102 is the starting point for the fabrication of the laminated composite components and corresponds to the spool of the composition material 408 that may be continuously dispensed on to the first conveyor. This is a continuous process and the spool may be continuously unwound. Certain prepreg composition material may have a backing paper that is automatically removed as the composition material is dispensed on to the conveyor. Next, at step 1104, a cutting device such as the USK may be used to cut the composition material in to predefined patterns. According to the example cutting device described in the present disclosure, this step may take approximately 5 seconds to cut each ply. Once the component layers are cut out, the pick and place device picks up the component layer at step 1106. In one example, this step may take approximately 1.5 seconds. Next, at step 1108, the pick and place device may rotate the component layer into a correct orientation before it is moved to the build station. This step may take approximately 1.5 seconds. The correctly oriented component layer may now be placed on the second conveyor at the build station at step 1110. This step may take approximately 1.5 seconds. The process of picking up, rotating, and placing a ply of the component layer is repeated until a desired or a predetermined number of plies are stacked on top of one another at the build station. Once the plies are stacked, the compaction device applies pressure on the stack and compacts the component layers at step 1112. In some examples, the laminated composite component may be made of 10 plies, and it may take approximately 10 seconds to compact with the compacting device. In other examples, the laminated composite component may be made of 12 plies and it may take longer to compact the 12 plies. The compacted laminated component is next provided to the inspection device which verifies the quality of the finished compacted laminated component to ensure it meets the design specification and tolerances at step 1114. This step may take approximately 5 seconds for each frame filler. Next, the inspected component is provided to the part marking process at step 1116 which may take approximately 5 seconds and then another 2 seconds or so to move the frame filler to the point-of-use at the mandrel at step 1118. Accordingly, a finished and read-to-use frame filler can be fabricated from raw material in about one minute by using the automated process provided throughout the present disclosure. The actual amount of time it takes may vary depending on the number of plies used in a particular frame filler and the type of machinery used. For example, certain robotic devices may move faster than others, certain the cutting devices may be able to cut faster, and certain compaction devices may be able to compact the component layers faster.

Figure 12:
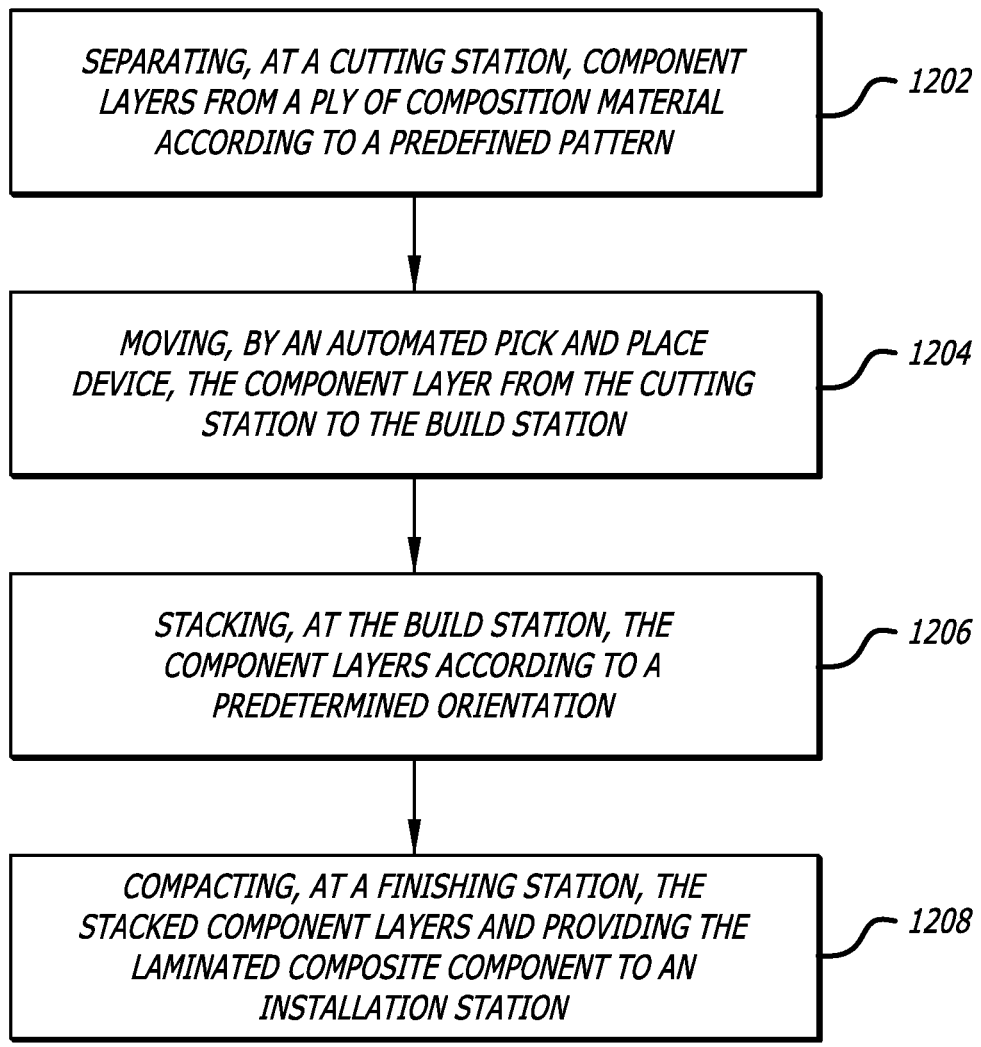
FIG. 12 is a flow diagram of the laminated composite component fabrication system, according to an example of the present disclosure.

FIG. 12 is a flow diagram of the laminated composite component fabrication system, according to an example of the present disclosure. The system may be configured to separate, at a cutting station, component layers from a ply of composition material according to various predefined patterns (1202). The predefined patterns may be configured and or selected based on design requirements for the intended component. Thus, the size, shape, and thickness of the frame filler depends on the location of the fuselage for which the frame filler is installed and may be programmed in to the cutting device so that the USK can cut out the appropriate pattern. The component layer is then moved from the cutting station to the build station by an automated pick and place device (1204). As the component layer is moved to the build station, the component layers are stacked one on top of another according to their predetermined orientation (1206). For example, certain frame fillers are comprised of 10 plies stacked together whereas other frame fillers are comprised of 12 or more plies stacked together. Once the required number of plies of the component layers are stacked, the stacked component layers are compacted at the finishing station by to produce a laminated composite component such as the frame filler. The completed frame filler is then provided to the installation station where the frame filler is installed on an aircraft (1208).

Figures 13, 14:
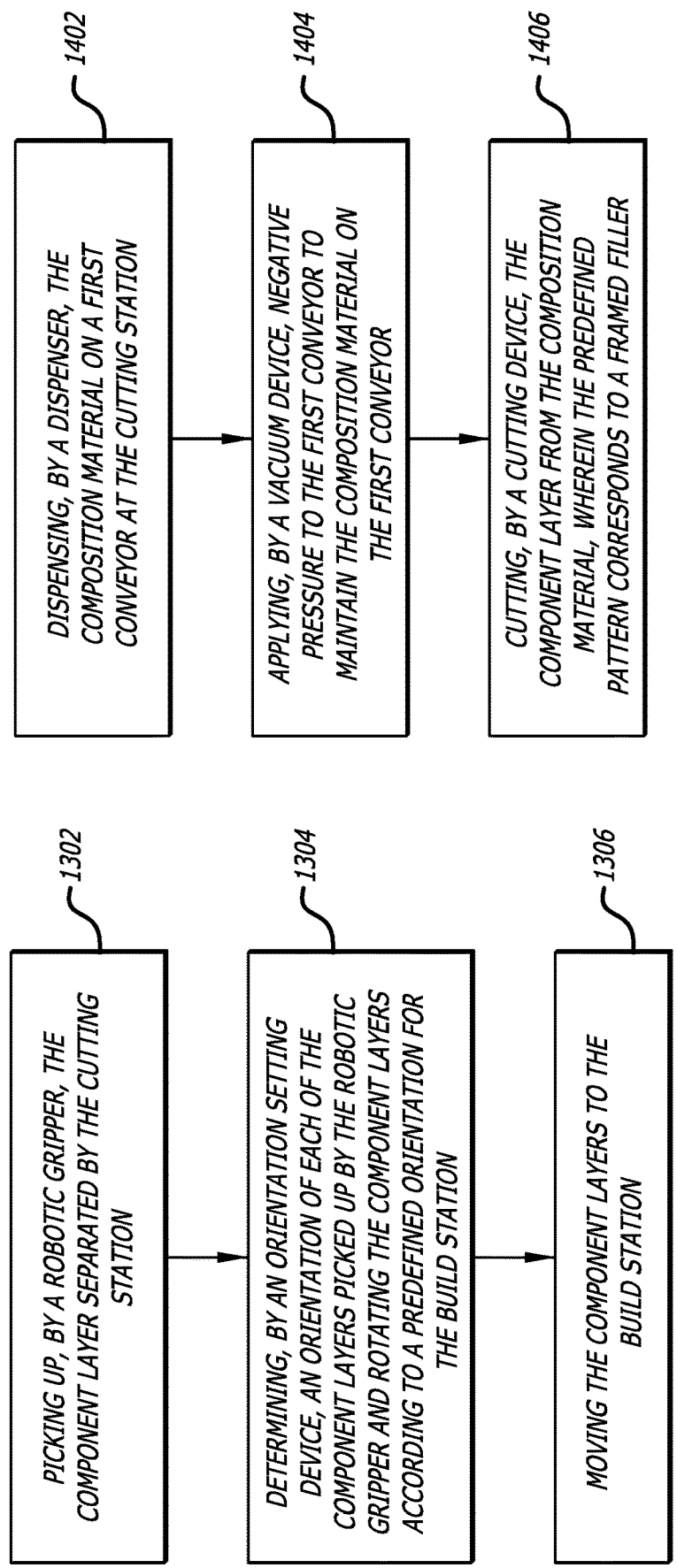
FIG. 13 is a flow diagram of the laminated composite component fabrication system, according to another example of the present disclosure.
FIG. 14 is a flow diagram of the laminated composite component fabrication system, according to another example of the present disclosure.

FIG. 13 is a flow diagram of the laminated composite component fabrication system, according to another example of the present disclosure. The pick and place device of the fabrication system may implement a robotic device having a robotic gripper configured to grip and pick up the component layer cut out by the cutting device at the cutting station (1302). The orientation of the component layer that is picked up by the robotic gripper is determined by an orientation determining device, such as, for example, a camera, and the component layer is rotated according to a predefined orientation for the build station (1304). The component layer is moved to the build station by the robotic device (1306).

FIG. 14 is a flow diagram of the laminated composite component fabrication system, according to another example of the present disclosure. At the cutting station, a dispenser dispenses the raw composition material on to the first conveyor (1402). A vacuum device may be configured to apply a negative pressure to the surface of the conveyor (e.g., the conveyor belt) to maintain the composition material on the conveyor (1404). As the composition material is conveyed toward the cutting device, the component layer is cut out by the cutting device from the composition material. The composition layer is cut to a predefined pattern that corresponds to a ply of the frame filler (1406). Accordingly, the raw composition material may be dispensed and precisely cut to a desired predefined pattern.

Figure 15:
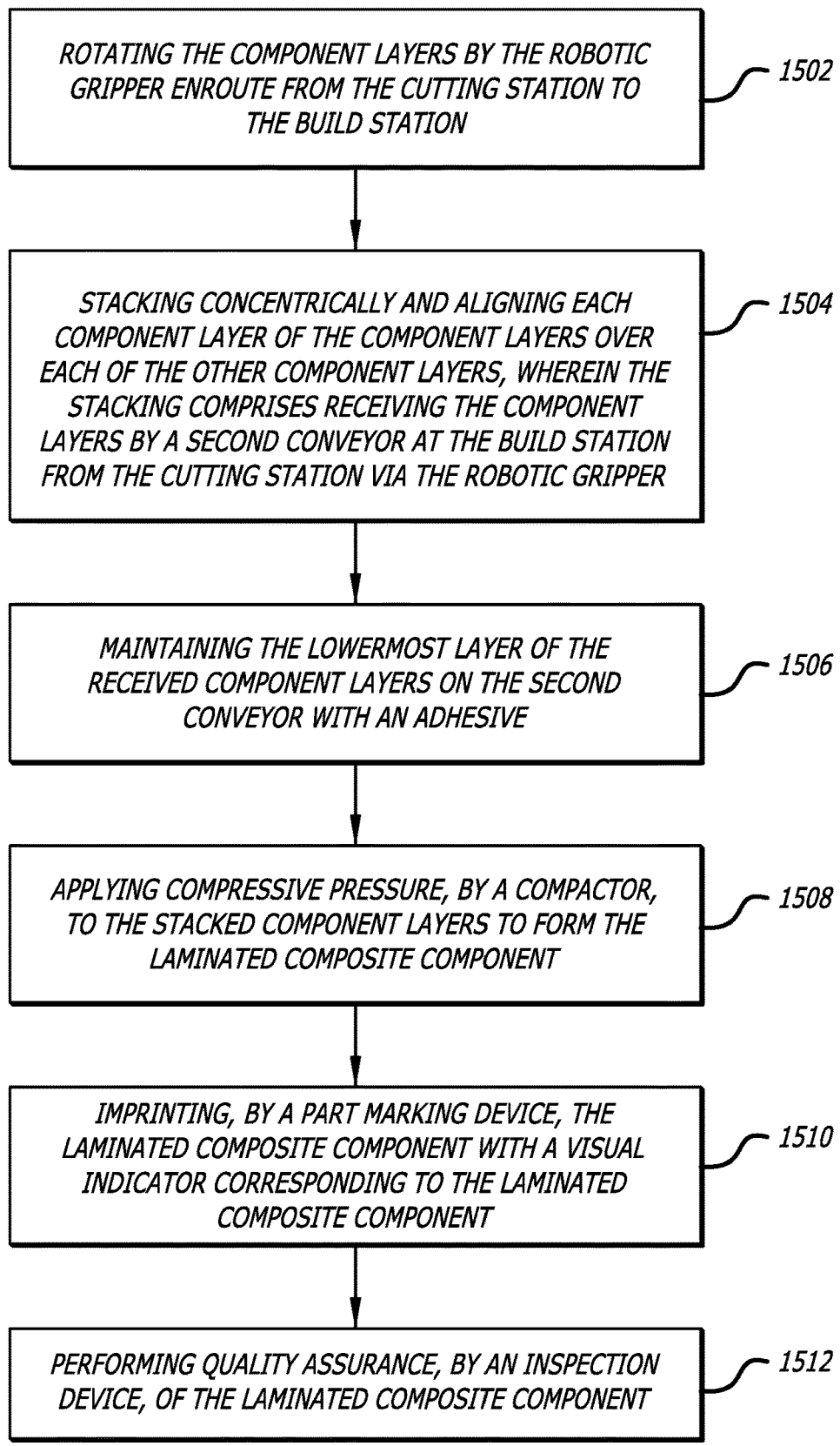
FIG. 15 is a flow diagram of the laminated composite component fabrication system, according to another example of the present disclosure.

FIG. 15 is a flow diagram of the laminated composite component fabrication system, according to another example of the present disclosure. The component layer may be rotated by the robotic gripper while it is being moved over from the cutting station to the build station. Thus, the component layer may be rotated enroute from the cutting station to the build station (1502). For example, the component layer may be rotated by the robotic gripper itself at some point after it is picked up by the gripper but before it is placed on the second conveyor. In other examples, the component layer may be placed on an orientation setting device as illustrated in FIG. 4 to first rotate the component layer to the correct orientation, and the robotic gripper may again pick up the orientation corrected component layer and move it to the build station. As each ply of the component layer is moved over to the build station, the robotic gripper places the component layer, one on top of another on the second conveyor of the build station, and each of the component layers is concentrically stacked and aligned over each of the other component layers (1504). In certain examples, the second conveyor may have an adhesive to hold or maintain the lowermost layer of the component layer that is placed by the robotic device (1506). The stacked component layers are then compacted by a compactor by applying a compressive pressure on the stacked component layers to form the laminated composite component (1508). Next, the laminated composite component may be imprinted by a part marking device with a visual indictor corresponding to the laminated composite component (1510). A quality assurance check may be performed on the finished laminated composite component by an inspection device such as a camera (1512). Accordingly, a frame filler may be fabricated on-demand, in the order that it is consumed at the point-of-use (e.g., an airplane assembly line). Thus, an airplane may be manufactured in a manner similar to a car assembly line with a continuous flow of components and material needed for the assembly being provided to the point-of-use in real-time, thereby improving efficiency, reducing waste, reducing cost, and reducing the size of the space needed to manufacture an airplane.

It is understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It is understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It is understood that when an element or layer is referred to as being "on," "connected to," or "coupled to" another element or layer, it can be directly on, connected to, or coupled to the other element or layer, or one or more intervening elements or layers may be present. In addition, it is understood that when an element or layer is referred to as being "between" two elements or layers, it can be the only element or layer between the two elements or layers, or one or more intervening elements or layers may also be present.

The electronic or electric devices and/or any other relevant devices or components according to examples of the present invention described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Examples described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A system for manufacturing laminated composite components, comprising:
 a cutting station comprising:
  a first conveyor configured to move a ply of composition material from a first end to a second end of the cutting station; and a cutting device configured to separate component layers from the ply of composition material according to a predefined pattern as the ply of composition material is moved along the first conveyor;

a build station comprising a second conveyor;

an automated robotic device configured to individually move each of the component layers from the first conveyor to the second conveyor and to stack the component layers according to a predetermined orientation for each of the component layers;

a finishing station configured to compact the stacked component layers to produce a laminated composite component; and an adhesive dispenser configured to dispense an adhesive layer onto the second conveyor to maintain a lowermost layer of the component layers received on the second conveyor.

2. The system of claim 1, wherein the finishing station comprises:

a compactor configured to apply compressive pressure to the stacked component layers to form the laminated composite component;

a part marking device configured to imprint the laminated composite component with a visual indicator corresponding to the laminated composite component; and an inspection device configured to perform quality assurance of the laminated composite component.

3. The system of claim 1, wherein the ply composition material comprises a single ply of prepreg composition material, and wherein the cutting device comprises an ultrasonic cutting device configured to cut the component layers from the single ply of prepreg composition material according to the predefined pattern.

4. The system of claim 1, wherein the predefined pattern corresponds to a frame filler and comprises varying sizes of patterns such that when the component layers are stacked according to a predetermined order on the second conveyor of the build station, the laminated composite component produced at the finishing station forms a tapered frame filler.

5. A method for manufacturing laminated composite components by utilizing the system of claim 1, the method comprising:

moving, by the first conveyor at the cutting station, the ply of composition material from the first end of the cutting station to the second end of the cutting station;

separating, by the cutting device at the cutting station, component layers from the ply of composition material according to the predefined pattern as the ply of composition material is moved;

moving, by the automated robotic device, each of the component layers from the first conveyor to the second conveyor at the build station to stack the component layers according to the predetermined orientation for each of the component layers;

compacting, at the finishing station, the stacked component layers to produce the laminated composite component; and dispensing the adhesive layer onto the second conveyor to maintain the lowermost layer of the received component layers on the second conveyor with the adhesive.

6. The method of claim 5, further comprising:

applying a negative pressure to a first portion of the first conveyor to maintain the ply of composition material on the first conveyor as the ply of composition material is moved; and applying a positive pressure to a second portion of the first conveyor as the ply of composition material is moved to remove scrap from the first conveyor and drop the scrap into a scrap bin positioned below the first conveyor.

7. The method of claim 5, wherein the automated robotic device is an automated pick and place device configured to move each of the component layers from the first conveyor at the cutting station to the second conveyor at the build station.

8. The method of claim 7, wherein the automated pick and place device comprises a robotic gripper and an orientation determining device and wherein moving, by the automated robotic device, each of the component layers comprises:

picking up, by robotic gripper, a component layer of the component layers separated by the cutting station from the first conveyor;

determining, by the orientation determining device, a current orientation of the component layer after being picked up by the robotic gripper;

rotating the component layer that is picked up from the current orientation to a new orientation; and moving the component layer to the second conveyor at the build station, wherein the new orientation is selected such that the component layer is placed with the predetermined orientation corresponding to the component layer on the second conveyor.

9. The method of claim 5, further comprising:

placing, by the automated robotic device, a component layer of the component layers on an orientation setting device prior to moving the component layer to the second conveyor;

determining a current orientation of the component layer on the orientation setting device; and rotating the component layer on the orientation setting device from the current orientation to a new orientation that allows the automated robotic device to pick up the component layer having the new orientation and place the component layer with the predetermined orientation corresponding to the component layer on the second conveyor.

10. The method of claim 5, further comprising:

stacking concentrically and aligning each component layer of the component layers over each of the other component layers.

11. The method of claim 5, wherein the compacting at the finishing station further comprises:

applying compressive pressure, by a compactor, to the stacked component layers to form the laminated composite component;

imprinting, by a part marking device, the laminated composite component with a visual indicator or letter corresponding to the laminated composite component; and performing quality assurance, by an inspection device, of the laminated composite component.

12. The method of claim 5, further comprising:

dispensing, by a dispenser, the ply of composition material on the first conveyor at the cutting station.

13. The method of claim 5, wherein the ply of composition material comprises a single ply of prepreg composition material, and wherein the cutting device comprises an ultrasonic cutting device.

14. The method of claim 5, wherein the predefined pattern corresponds to a frame filler and comprises varying sizes of patterns such that when the component layers are stacked according to a predetermined order on the second conveyor at the build station, the laminated composite component produced at the finishing station forms a tapered frame filler.

15. A system for manufacturing laminated composite components, comprising:
- a cutting station comprising:
  - a first conveyor configured to move a ply of composition material from a first end to a second end of the cutting station; and
  - a cutting device configured to separate component layers from the ply of composition material according to a predefined pattern as the ply of composition material is moved along the first conveyor;
- a build station comprising a second conveyor;
- an automated robotic device configured to individually move each of the component layers from the first conveyor to the second conveyor and to stack the component layers according to a predetermined orientation for each of the component layers;
- a finishing station configured to compact the stacked component layers to produce a laminated composite component;
- an orientation setting device, wherein the automated robotic device is configured to place a component layer of the component layers on the orientation setting device prior to moving the component layer to the second conveyor; and
- an orientation scanner configured to determine a current orientation of the component layer on the orientation setting device;
- wherein the orientation setting device is configured to rotate the component layer from the current orientation on the orientation setting device to a new orientation that allows the automated robotic device to pick up the component layer having the new orientation and place the component layer with the predetermined orientation corresponding to the component layer on the second conveyor.

16. The system of claim 15, further comprising:
- a scrap bin positioned below the first conveyor; and
- a vacuum device configured to apply a negative pressure to a first portion of the first conveyor to maintain the ply of composition material on the first conveyor and configured to apply a positive pressure to a second portion of the first conveyor to remove scrap from the first conveyor and drop the scrap into the scrap bin.

17. The system of claim 15, wherein the automated robotic device comprises an automated pick and place device configured to move each of the component layers from the first conveyor of the cutting station to the second conveyor of the build station.

18. The system of claim 17, wherein the automated pick and place device comprises:
- a robotic gripper configured to pick up a component layer of the component layers separated by the cutting station from the first conveyor, rotate the component layer that is picked up, and move the component layer to the second conveyor of the build station; and
- an orientation determining device configured to determine a current orientation of the component layer after being picked up by the robotic gripper;
- wherein the robotic gripper is configured to rotate the component layer from the current orientation to a new orientation such that the robotic gripper places the component layer with the predetermined orientation corresponding to the component layer on the second conveyor of the build station.

19. The system of claim 15, wherein each component layer of the component layers is concentrically stacked and aligned over each of the other component layers.

20. The system of claim 15, wherein the cutting station further comprises:
- a dispenser configured to dispense the ply of composition material on the first conveyor.

* * * * *